(12) United States Patent
Koga et al.

(10) Patent No.: US 8,696,083 B2
(45) Date of Patent: Apr. 15, 2014

(54) IMAGE RECORDING APPARATUS

(75) Inventors: Yuji Koga, Nagoya (JP); Naohisa Kinoshita, Nagoya (JP); Shingo Ito, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 89 days.

(21) Appl. No.: 13/532,439

(22) Filed: Jun. 25, 2012

(65) Prior Publication Data

US 2012/0274696 A1   Nov. 1, 2012

Related U.S. Application Data

(63) Continuation of application No. 12/726,859, filed on Mar. 18, 2010, now Pat. No. 8,205,955.

(30) Foreign Application Priority Data

Mar. 31, 2009   (JP) .................................. 2009-087970

(51) Int. Cl.
   *B41J 29/393*   (2006.01)
   *B41J 29/38*   (2006.01)

(52) U.S. Cl.
   USPC ............................................. 347/16; 347/19

(58) Field of Classification Search
   USPC ..................................................... 347/16, 19
   See application file for complete search history.

(56) References Cited

U.S. PATENT DOCUMENTS

| 6,520,700 B1 | 2/2003 | Iwata |
| 2005/0168187 A1 | 8/2005 | Uchiyama et al. |
| 2008/0073832 A1 | 3/2008 | Sudo et al. |
| 2009/0080006 A1 | 3/2009 | Aoki |
| 2010/0044959 A1 | 2/2010 | Saito et al. |

FOREIGN PATENT DOCUMENTS

| JP | H01-233958 A | 9/1989 |
| JP | H10-038902 A | 2/1998 |
| JP | 2001-180057 A | 7/2001 |
| JP | 2005-168280 A | 6/2005 |
| JP | 2006-224380 A | 8/2006 |
| JP | 2007-161389 A | 6/2007 |
| JP | 2007-197186 A | 8/2007 |
| JP | 2008-018604 A | 1/2008 |
| JP | 2008-068479 A | 3/2008 |
| JP | 2008-273111 A | 11/2008 |
| JP | 2010-047413 A | 3/2010 |

OTHER PUBLICATIONS

Japan Patent Office, Notice of Reasons for Rejection for Japanese Patent Application No. 2009-087970 (counterpart to co-pending U.S. Appl. No. 12/726,859), mailed Jan. 18, 2011.

*Primary Examiner* — Julian Huffman
(74) *Attorney, Agent, or Firm* — Baker Botts L.L.P.

(57) ABSTRACT

An image recording apparatus includes a conveyance roller which conveys the recording medium, a drive source for rotating the conveyance roller, a print head and a carriage mounted with the print head. The carriage includes an abutment portion. The image recording apparatus further includes a carriage position detector which detects a position of the carriage in a movement direction of the carriage and still further includes a rotating body which rotates in synchronization with the conveyance roller. The rotating body includes a reference portion which protrudes or depresses in the movement direction at a predetermined rotation phase of the rotating body and abut with the reference portion. Moreover, the image recording apparatus includes an origin determination section which, based on a result of the detection by the carriage position detector, determines an origin position of a rotation phase of the conveyance roller.

16 Claims, 12 Drawing Sheets

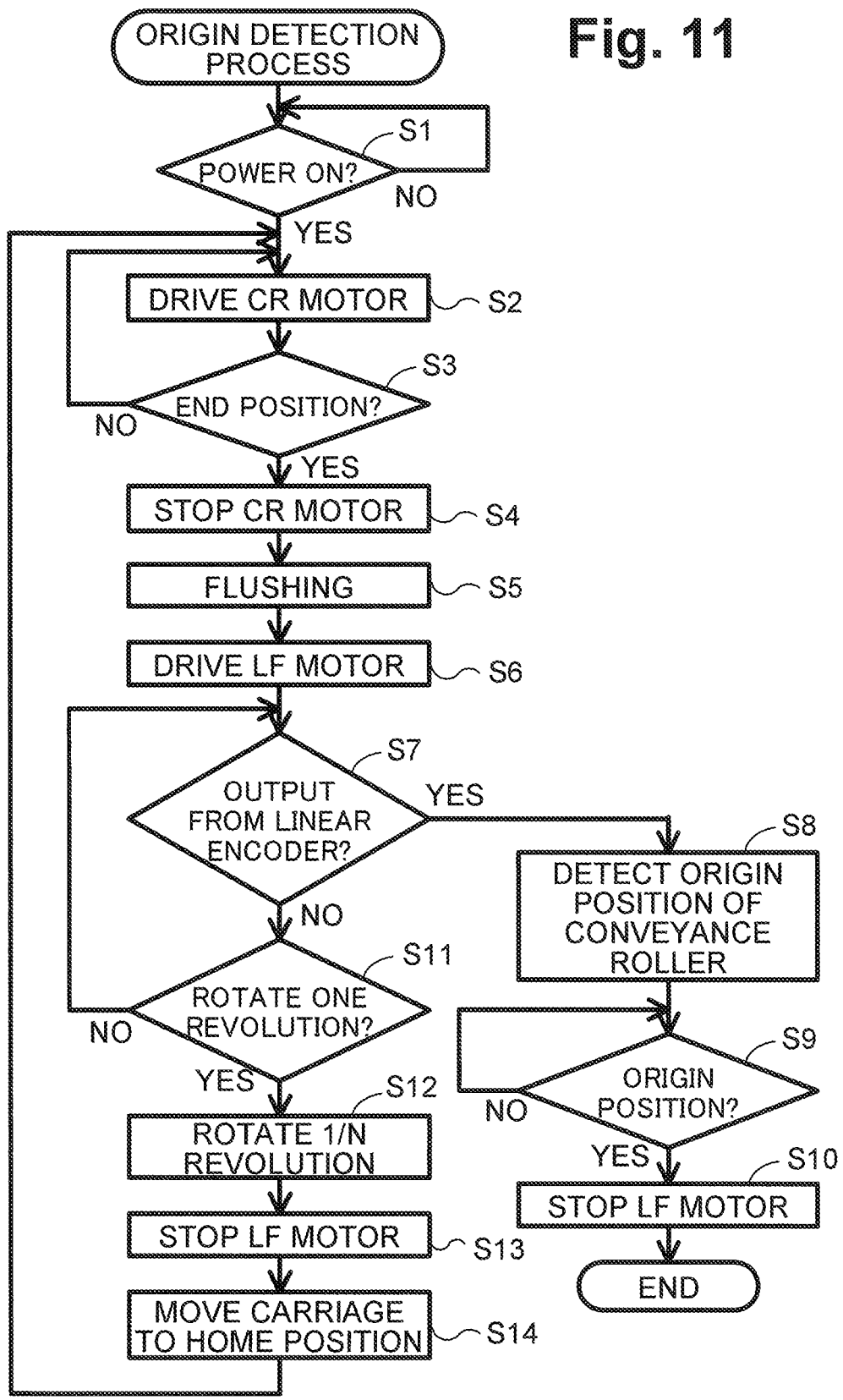

IMAGE RECORDING APPARATUS

CROSS REFERENCE TO RELATED APPLICATION

The present application is a continuation application of U.S. patent application Ser. No. 12/726,859, filed on Mar. 18, 2010, which claims priority from Japanese Patent Application No. 2009-087970, filed on Mar. 31, 2009, the disclosures of which are incorporated herein by reference in their entirety.

BACKGROUND

1. Technical Field

The present invention relates to an image recording apparatus which detects an origin position of a rotation phase of a conveyance roller.

2. Related Art

An image recording apparatus is known on which a dedicated sensor which detects an origin position of a conveyance roller which conveys a recording sheet is provided in order to increase the conveyance accuracy of the conveyance roller and improve an image quality. However, when providing the dedicated sensor, there is a problem in that the apparatus increases not only in cost, but also in size.

SUMMARY

A need has arisen to provide an image recording apparatus which can accurately detect an origin position of a conveyance roller while reducing an increase in size or cost of the apparatus.

According to an embodiment of the present invention, the image recording apparatus comprises a conveyance roller which conveys the recording medium through a conveyance path in a conveyance direction. The image recording apparatus further comprises a drive source for rotating the conveyance roller and a synchronous shaft which rotates in synchronization with the conveyance roller. The image recording apparatus still further comprises a rotation amount detector which detects a rotation amount of the synchronous shaft. Moreover, the image recording apparatus comprises a print head which executes an image recording on the recording medium conveyed by the conveyance roller and a carriage which, being mounted with the print head, moves in a movement direction intersecting the conveyance direction. The carriage includes an abutment portion. The image recording apparatus further comprises a carriage position detector which detects a position of the carriage in the movement direction and a rotating body which rotates in synchronization with the conveyance roller. The rotating body includes a reference portion which protrudes or depresses in the movement direction at a predetermined rotation phase of the rotating body. The image recording apparatus still further comprises an origin determination section which moves the abutment portion of the carriage to a detection position where the abutment portion the reference portion of the rotating body can make abutment with the abutment portion, drives the drive source to rotate the conveyance roller and the rotating body, and, based on a result of the detection by the carriage position detector, determines an origin position of a rotation phase of the conveyance roller.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein:

FIG. 11 is a flowchart illustrating a procedure of processes carried out in the complex machine when the complex machine is powered on.

DESCRIPTION OF THE PREFERRED EMBODIMENT(S)

Figure 1:
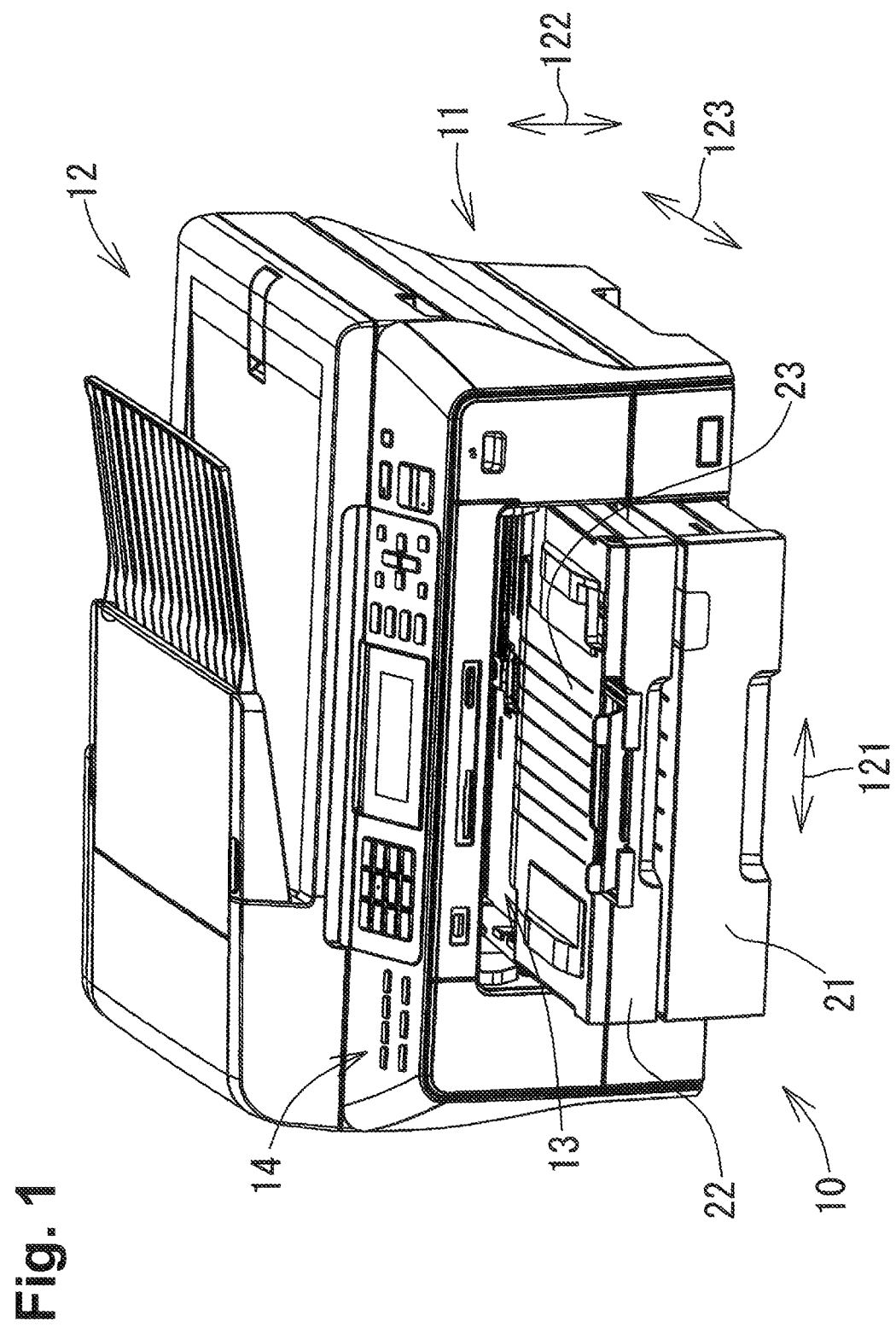
FIG. 1 is a perspective view showing an external configuration of a complex machine according to an embodiment of the invention.

Embodiments of the invention and their features and advantages may be understood by referring to FIGS. 1-12, like numerals being used for like corresponding parts in the various drawings. Referring now to the drawings as needed, an embodiment of the invention will be described in detail.

Outline Configuration of Complex Machine 10

As shown in FIG. 1, a complex machine 10, integrally including a printer 11 and a scanner 12, has a printing function, a scanning function, a copying function, and a facsimile function. The printer 11 is an example of an image recording apparatus. The complex machine 10 not necessarily including the scanner 12. The image recording apparatus may also be implemented as a single-function printer which does not have the scanning function or copying function. Consequently, a description of a detailed configuration of the scanner 12 is omitted here.

The printer 11 is provided in the lower portion of the complex machine 10. An opening 13 is formed on the front side of the printer 11. A paper feed cassette 21 and a paper feed cassette 22 are mounted in the printer 11 through the opening 13. Standard-size rectangular printing paper 50 is placed in the paper feed cassettes 21 and 22 (refer to FIG. 2). With the printer 11, the printing paper 50 is selectively fed into the printer 11 from the paper feed cassette 21 or paper feed cassette 22. The printing paper 50, after an image is recorded thereon by a recording section 40 (refer to FIG. 2), is discharged onto a top surface 23 of the paper feed cassette 22. The top surface 23 functions as a paper discharge tray. The printing paper 50 is an example of a recording medium.

The complex machine 10 is used mainly in a condition in which it is connected to external information equipment (not shown) such as a computer. The printer 11, based on print data received from the external information equipment, or on image data of a manuscript read by the scanner 12, records an image on the printing paper 50.

An operation panel 14 is provided on the upper front of the complex machine 10. A display, which displays various kinds of information, and input keys, which receive inputs of information, are provided on the operation panel 14. The complex machine 10 operates based on instruction information input from the operation panel 14, or on instruction information transmitted from the external information equipment via a printer driver, a scanner driver, or the like.

Printer 11

Hereafter, a description will be given, while referring to FIGS. 2 to 7 as appropriate, of a configuration of the printer 11.

Figure 2:
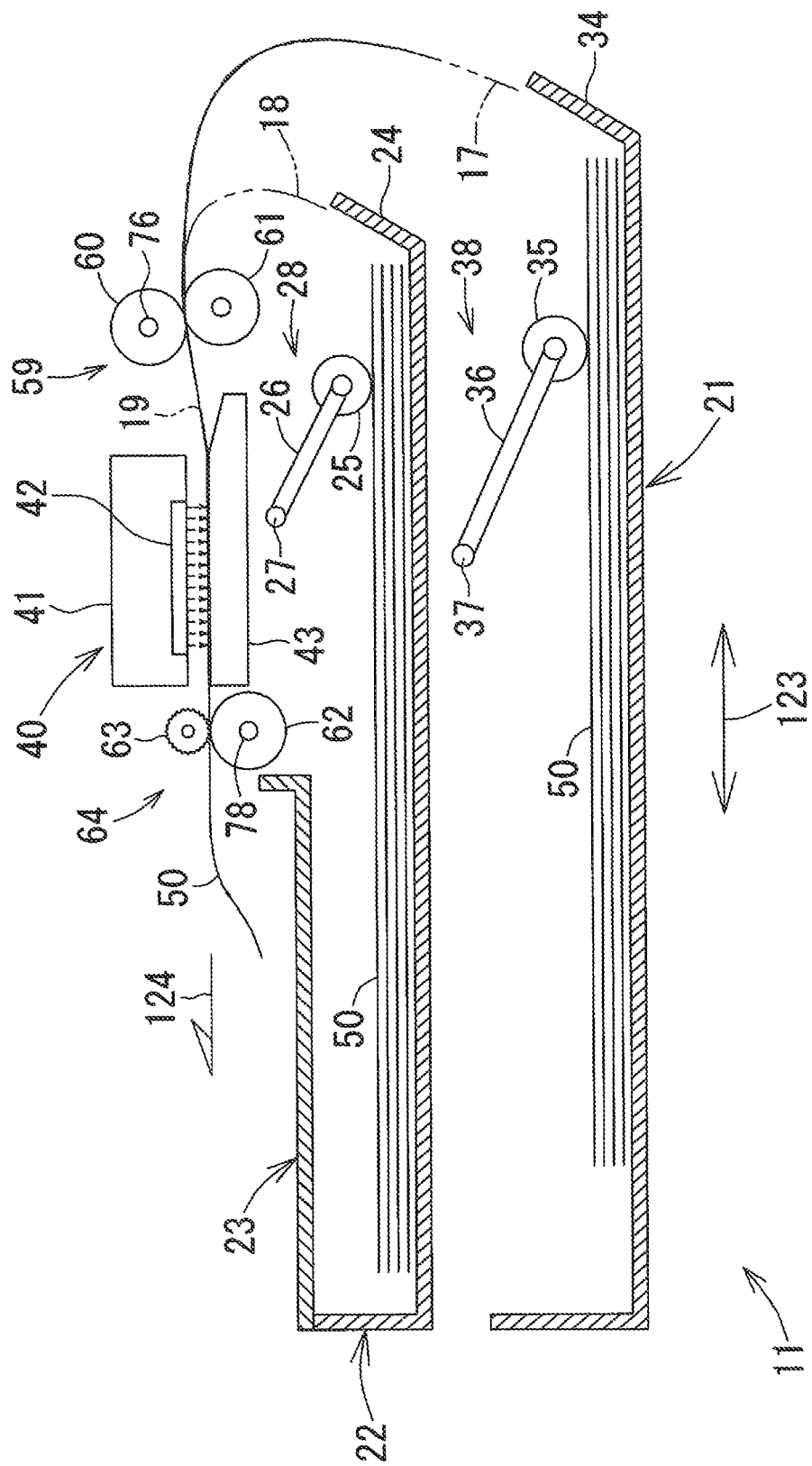
FIG. 2 is a schematic diagram showing an internal configuration of a printer.

As shown in FIG. 2, the paper feed cassette 21 and paper feed cassette 22 are disposed one on the other with the paper feed cassette 22 on the upper side. Both the paper feed cassette 21 and paper feed cassette 22 hold the printing paper 50 on which an image recording is carried out. By the two independent paper feed cassettes 21 and 22 being provided, printing paper 50 of a differing size or type can be held in each of them.

The paper feed cassette 21 is a container-shaped one of which one portion on the back side of the complex machine 10 is opened, and the printing paper 50 is placed in a stacked condition in the internal space of the paper feed cassette 21. Printing paper 50 of various kinds of size such as, for example, an A4 size, a B5 size, and a postcard size, which are smaller than an A3 size, can be contained in the paper feed cassette 21.

The paper feed cassette 22 is a container-shaped one of which one portion on the back side (the right side in FIG. 2) of the complex machine 10 is opened, and the printing paper 50 is placed in a stacked condition in the internal space of the paper feed cassette 22. Printing paper 50 of various kinds of size such as, for example, an A4 size, a B5 size, and a postcard size, which are smaller than an A3 size, can be contained in the paper feed cassette 22. The top surface 23 of the paper feed cassette 22 is provided on the front side (the left side in FIG. 2) of the complex machine 10.

First Feed Section 28

A conveyance path 18 formed in a curved shape is provided on the upper side of an inclined plate 24 of the paper feed cassette 22. On the paper feed cassette 22 being mounted in the printer 11, the inclined plate 24 is disposed below the conveyance path 18, and a first feed section 28 is disposed on the upper side of the paper feed cassette 22. The first feed section 28 includes a feed roller 25, an arm 26, and a shaft 27. The feed roller 25 is rotatably provided on the leading end side of the arm 26. The arm 26 is pivotably provided on the shaft 27 supported on a housing of the printer 11. The arm 26 is pivotally biased toward the paper feed cassette 22 side by its own weight or under the elastic force of a spring or the like.

Second Feed Section 38

A conveyance path 17 formed in a curved shape is provided on the upper side of an inclined plate 34 of the paper feed cassette 21. On the paper feed cassette 21 being mounted in the printer 11, the inclined plate 34 is disposed below the conveyance path 17, and a second feed section 38 is disposed on the upper side of the paper feed cassette 21. The second feed section 38 includes a feed roller 35, an arm 36, and a shaft 37. The feed roller 35 is rotatably provided on the leading end side of the arm 36. The arm 36 is pivotably provided on the shaft 37 supported on the housing of the printer 11. The arm 36 is pivotally biased toward the paper feed cassette 21 side by its own weight or under the elastic force of a spring or the like.

Conveyance Paths 17, 18, and 19

A conveyance path 19 continuous with the conveyance path 17 and conveyance path 18 is provided inside the printer 11. The conveyance path 19, being a path along which is conveyed the printing paper 50 conveyed along the conveyance path 17 or conveyance path 18, is extended from a position in which the conveyance path 17 and conveyance path 18 meet, toward the front side of the complex machine 10, as far as a position above the top surface 23 of the paper feed cassette 22.

Platen 43

A platen 43 (refer to FIGS. 2 and 3) is provided in the conveyance path 19. The platen 43 supports the printing paper 50, conveyed along the conveyance path 19, from below. The recording section 40 is disposed on the upper side of the platen 43. The recording section 40 will be described hereafter.

Figure 3:
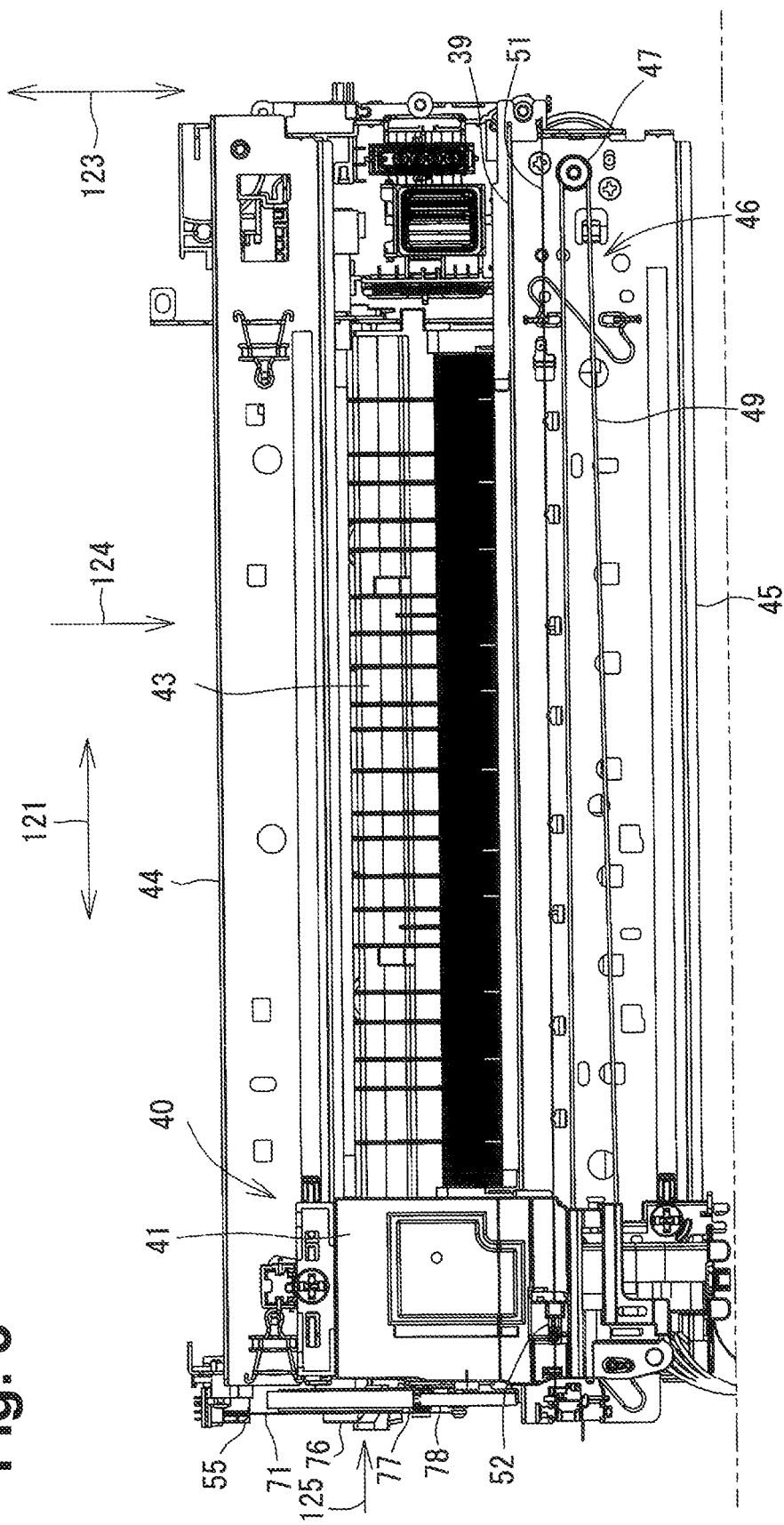
FIG. 3 is a partial plan view showing the internal configuration of the printer.
Figure 4:
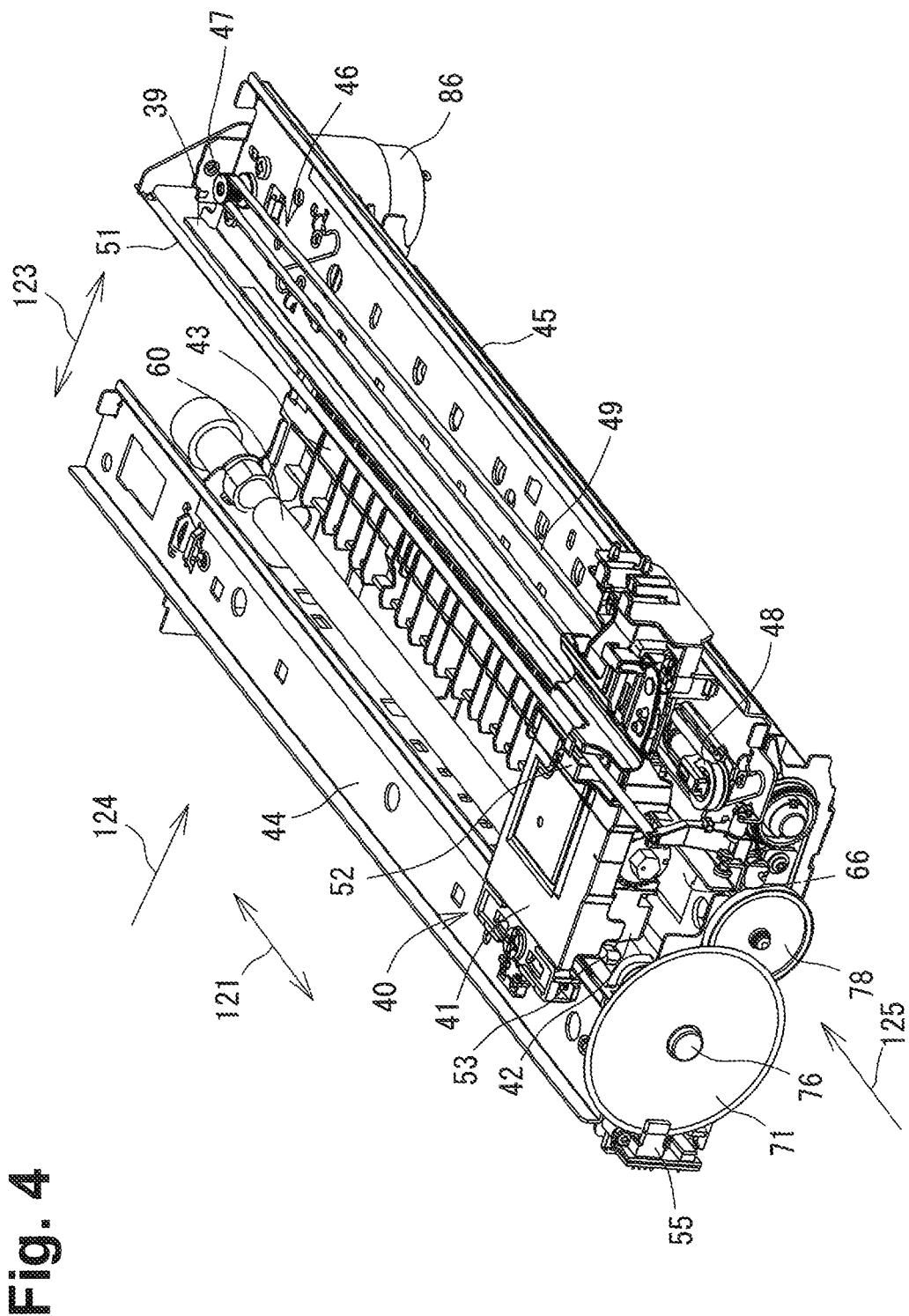
FIG. 4 is a partial perspective view showing the internal configuration of the printer.
Figure 5:
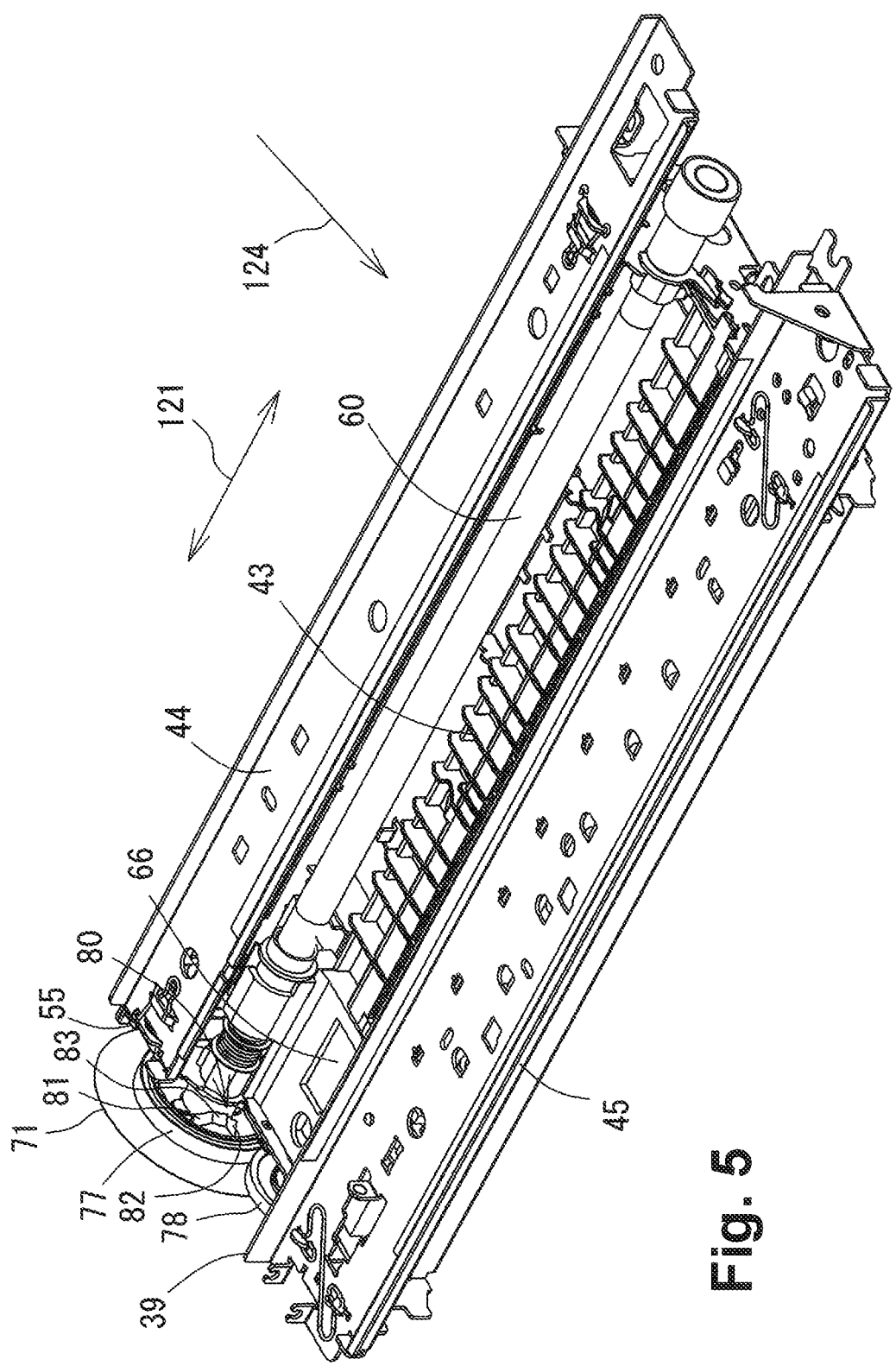
FIG. 5 is a partial perspective view showing a configuration around a transmission gear.

As shown in FIGS. 4 and 5, a waste ink tray 66 is provided on a side which is one end of the platen 43 in a width direction 121, and on which a transmission gear 77 (refer to FIG. 3), to be described hereafter, is disposed. The waste ink tray 66 receives ink droplets ejected from a print head 42 for the purpose of maintenance. The waste ink tray 66 is of a tray shape corresponding to a nozzle area of the print head 42, and the internal space thereof is filled with an ink absorbent. The ink absorbent absorbs and holds the ink droplets ejected from the print head 42. For example, in the event that a purging is carried out, and ink in the nozzle area is wiped out by a wiper, there is a risk of a slight amount of ink of other than an appropriate ink color being trapped into each nozzle orifice, or a risk of the meniscus of ink in each nozzle orifice taking on an abnormal condition. Consequently, by ejecting ink droplets from all the nozzle orifices of the print head 42 after the purging, the trapped ink is discharged, or the meniscus of ink in each nozzle orifice is restored to a normal condition. In the present specification, this kind of operation of ejecting ink droplets is called a flushing.

Conveyance Roller Pair 59

A conveyance roller pair 59 is provided on a side upstream of the platen 43 in a conveyance direction 124 of the printing paper 50. The conveyance roller pair 59 is configured of a conveyance roller 60 and a pinch roller 61. The conveyance roller 60, being disposed on the upper side of the conveyance path 19, rotates under a drive force from an LF motor 85 (an example of a drive source) shown in FIG. 6. The pinch roller 61, being rotatably disposed on the lower side of the conveyance roller 60 across the conveyance path 19, is biased by a spring toward the conveyance roller 60.

Discharge Roller Pair 64

A discharge roller pair 64 is provided on a side downstream of the platen 43 in the conveyance direction 124 of the printing paper 50. The discharge roller pair 64 is configured of a discharge roller 62 and a spur wheel 63. The discharge roller 62, being disposed on the lower side of the conveyance path 19, rotates under the drive force from the LF motor 85 (refer to FIG. 6). The spur wheel 63, being rotatably disposed on the upper side of the discharge roller 62 across the conveyance path 19, is biased by a spring toward the discharge roller 62.

Encoder Disk 71 and Optical Sensor 55

As shown in FIGS. 3 to 6, an encoder disk 71 is provided on a shaft 76 of the conveyance roller 60. The encoder disk 71 being a transparent disk-shaped disk, light blocking marks are made thereon at a predetermined pitch in a circumferential direction. The encoder disk 71, being fixed to the shaft 76 of the conveyance roller 60, rotates together with the conveyance roller 60. The optical sensor 55 includes a light emitting element and a light receiving element, facing each other, spaced a predetermined distance apart in the width direction 121. The optical sensor 55 is provided in such a way that the peripheral edge of the encoder disk 71 is positioned in a space between the light emitting element and light receiving element. On light being received by the light receiving element of the optical sensor 55, an electrical signal with a level corresponding to the luminance of the light received is generated in the optical sensor 55. An electrical signal with a low level is generated in a condition in which a mark is positioned between the light emitting element and light receiving element. An electrical signal with a high level is generated in a condition in which no mark is positioned between the light emitting element and light receiving element. That is, a pulse signal is generated every time a mark of the encoder disk 71 is detected by the optical sensor 55. The pulse signal is output to a controller 100. A first detection unit is realized by the encoder disk 71 and optical sensor 55.

Recording Section 40

As shown in FIGS. 2 to 4, the recording section 40 is disposed above the platen 43, facing the platen 43, spaced a predetermined distance away from the platen 43. That is, the recording section 40 is disposed downstream of the conveyance roller pair 59 in the conveyance direction 124. The recording section 40 includes the ink-jet recording type of print head 42 and a carriage 41.

Carriage 41

As shown in FIG. 4, the carriage 41 forms a parallelepiped shape. The print head 42, being mounted on the carriage 41, is exposed on the bottom side thereof. The carriage 41 can move in the width direction 121 along guide frames 44 and 45, to be described hereafter. An abutment portion 53 protruding in the width direction 121 is provided on a side surface, of the two side surfaces of the carriage 41 opposed in the width direction 121, which faces the transmission gear 77 (refer to FIG. 3). A reference portion 80, to be described hereafter, of the transmission gear 77 can make abutment with the abutment portion 53.

Guide Frames 44 and 45

As shown in FIGS. 3 and 4, the pair of guide frames 44 and 45 is provided, on the upper side of the conveyance path 19, spaced a predetermined distance apart in the conveyance direction 124. The guide frames 44 and 45 are provided extending in the width direction 121. The guide frame 44 is provided on a side upstream of the guide frame 45 in the conveyance direction 124. The carriage 41 is placed on the guide frames 44 and 45 in such a way as to bridge the guide frames 44 and 45. The carriage 41 faces the platen 43 across the conveyance path 19. In FIG. 2, the guide frames 44 and 45 are omitted.

An end portion of the carriage 41 on the upstream side in the conveyance direction 124 is slidably supported on the top surface of the guide frame 44. An end portion of the carriage 41 on the downstream side in the conveyance direction 124 is slidably supported on the top surface of the guide frame 45. An end portion 39 of the guide frame 45, being a portion of the guide frame 45 bent upward at approximately a right angle, is extended in the width direction 121. The carriage 41 holds the end portion 39 between its unshown rollers or the like. Therefore, the carriage 41 moves in the width direction 121 with the end portion 39 as a reference.

Belt Drive Mechanism 46

As shown in FIGS. 3 and 4, a belt drive mechanism 46 is provided on the top surface of the guide frame 45. The belt drive mechanism 46 includes a drive pulley 47, a driven pulley 48, and a belt 49. The drive pulley 47 and driven pulley 48 are provided one in the vicinity of either end of the guide frame 45 in the width direction 121. The belt 49, being an endless annular belt on the inner side of which teeth are provided, is stretched between the drive pulley 47 and driven pulley 48.

A CR motor 86 (refer to FIG. 4) is connected to the shaft of the drive pulley 47. The drive pulley 47 rotates under the drive force of the CR motor 86. The belt 49 moves circularly by means of the rotative force of the drive pulley 47. As the carriage 41 is fixed to the belt 49, it moves in the width direction 121 by the belt 49 moving circularly.

Encoder Strip 51 and Optical Sensor 52

As shown in FIGS. 3 and 4, an encoder strip 51 is provided on the guide frame 45. The encoder strip 51 is provided stretched over a movement range of the carriage 41 in the width direction 121. The encoder strip 51 is a strip-shaped one made of a transparent resin. A pattern in which light blocking portions, which block light, and light transmission portions, which transmit light, are alternately arranged at equal pitches is formed on the encoder strip 51. An optical sensor 52 for detecting the pattern of the encoder strip 51 is mounted on the carriage 41.

The optical sensor 52 includes a light emitting element and a light receiving element, facing each other, spaced a predetermined distance apart in a depth direction 123. The optical sensor 52 is provided in such a way that the encoder strip 51 is positioned in a space between the light emitting element and light receiving element. On light being received by the light receiving element of the optical sensor 52, an electrical signal with a level corresponding to the luminance of the light received is generated in the optical sensor 52. An electrical signal with a low level is generated in a condition in which a mark is positioned between the light emitting element and light receiving element. An electrical signal with a high level is generated in a condition in which no mark is positioned between the light emitting element and light receiving element. That is, a pulse signal is generated every time a mark of the encoder strip 51 is detected by the optical sensor 52. The pulse signal is output to the controller 100. A position detection unit is realized by the encoder strip 51 and optical sensor 52.

Print Head 42

As shown in FIGS. 2 and 4, nozzles of the print head 42 are exposed in the second surface of the carriage 41. A large number of nozzles are arrayed in the width direction 121 and depth direction 123. Ink is supplied to the print head 42 from an ink cartridge (not shown) disposed inside the printer 11. The carriage 41 is moved in the width direction 121 when the conveyance roller 60 and discharge roller 62 intermit to cause the printing paper 50 to remain stationary on the platen 43. The print head 42 is also moved in the width direction together with the carriage 41 and, during the movement, minute ink droplets are ejected selectively from the nozzles of the print head 42 toward the printing paper 50 on the platen 43. Then, the printing paper 50 is conveyed a predetermined linefeed width in the conveyed direction 124 by the conveyance roller pair 59 and discharge roller pair 64. An image is recorded on the printing paper 50 by the print head 42 while this kind of intermittent conveyance of the printing paper 50 and the movement of the carriage 41 are being alternately repeated.

LF Motor 85

Figure 6:
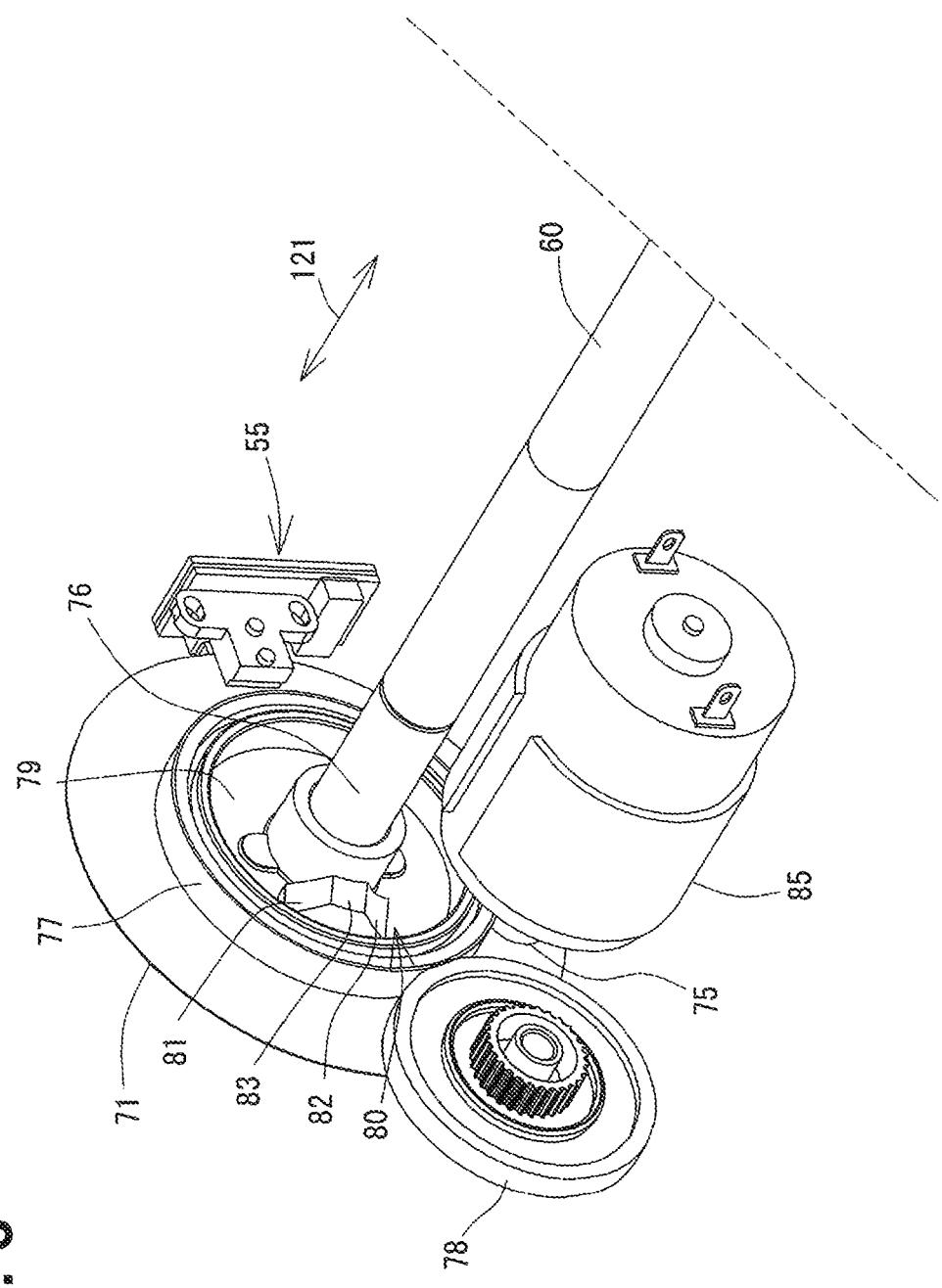
FIG. 6 is an enlarged perspective view showing the configuration around the transmission gear.

As shown in FIG. 6, the LF motor 85 is provided in the printer 11. The LF motor 85 rotates the conveyance roller 60 and discharge roller 62 while controlling the rotation thereof.

The LF motor 85 includes, for example, a DC motor. The LF motor 85 corresponds to the drive source for the conveyance roller 60.

An output shaft 75 of the LF motor 85, having spur teeth formed on the outer periphery thereof, meshes with the transmission gear 77. The transmission gear 77, being a spur gear, and coaxially connected to the shaft 76 of the conveyance roller 60, rotates in synchronization with the shaft 76. The rotation of the LF motor 85 is transmitted to the shaft 76 of the conveyance roller 60 by the transmission gear 77. The transmission gear 77 corresponds to a rotating body.

The transmission gear 77 is meshed with a transmission gear 78. Unshown additional transmission gears are connected in series to the transmission gear 78, and finally connected to the shaft of the discharge roller 62. Therefore, the rotation of the LF motor 85 is also transmitted to the shaft of the discharge roller 62, and the conveyance roller 60 and discharge roller 62 are rotated in synchronization.

The conveyance roller 60 and discharge roller 62 are intermittently driven by the LF motor 85 when an image recording by the recording section 40 is carried out. The intermittent drive is a drive method whereby the LF motor 85 is continuously driven until the conveyance roller 60 and discharge roller 62 rotate by a rotation amount equivalent to a predetermined target conveyance amount while, on the target conveyance amount being reached, the LF motor 85 is stopped for a predetermined time, and these operations are repeated alternately.

On the printing paper 50 fed to the conveyance path 19 arriving between the conveyance roller 60 and pinch roller 61, the printing paper 50 is ejected onto the platen 43 under the rotative force of the conveyance roller 60 on a condition that the printing paper 50 is held between the conveyance roller 60 and pinch roller 61. On the printing paper 50 reaching a position between the discharge roller 62 and spur wheel 63, the printing paper 50 is ejected to a position above the paper feed cassette 22 under the rotative force of the discharge roller 62 on a condition that the printing paper 50 is held between the discharge roller 62 and spur wheel 63.

In this way, the printing paper 50 is conveyed on the platen 43 under the rotative force of at least one of the conveyance roller 60 and discharge roller 62. At this time, as the conveyance roller 60 and discharge roller 62 are being intermittently driven, the printing paper 50 is intermittently conveyed along the conveyance path 19. Then, the image recording by the recording section 40 is carried out while the printing paper 50 is being caused to remain stationary on the platen 43 during the intermittent conveyance.

The conveyance roller 60 and discharge roller 62 do not have to be intermittently driven while no image recording is being carried out by the recording section 40. Consequently, the conveyance roller 60 and discharge roller 62 may be continuously rotated before a recording operation by the print head 42 is started, or after the recording operation is completed.

Transmission Gear 77

As shown in FIGS. 5 and 6, the reference portion 80 is provided on a surface 79 of the transmission gear 77 facing the carriage 41 side. The reference portion 80, being disposed at a predetermined rotation phase of the transmission gear 77, is protruded from the surface 79 in the width direction 121, which is a direction of movement of the carriage 41. The reference portion 80 has inclined surfaces 81 and 82, which continue to the surface 79 at a predetermined inclination angle thereto, and a surface 83 which, being disposed between the inclined surfaces 81 and 82, is parallel to the surface 79. The inclined surfaces 81 and 82 are surfaces inclined largely in the circumferential direction of the transmission gear 77.

As shown in FIGS. 3 and 4, the transmission gear 77 is disposed in the width direction 121 with respect to the carriage 41 on a condition that the carriage 41 is assembled to the guide frames 44 and 45, and the like. In the event of seeing the transmission gear 77 from a line of sight 125 in the width direction 121, the reference portion 80, by the transmission gear 77 being rotated, passes through a projection plane of the carriage 41 in the width direction 121. That is, the reference portion 80 can make abutment with the abutment portion 53 of the carriage 41 on a condition that the carriage 41 is moved to the immediate lateral side of the transmission gear 77.

Controller 100

Figure 7:
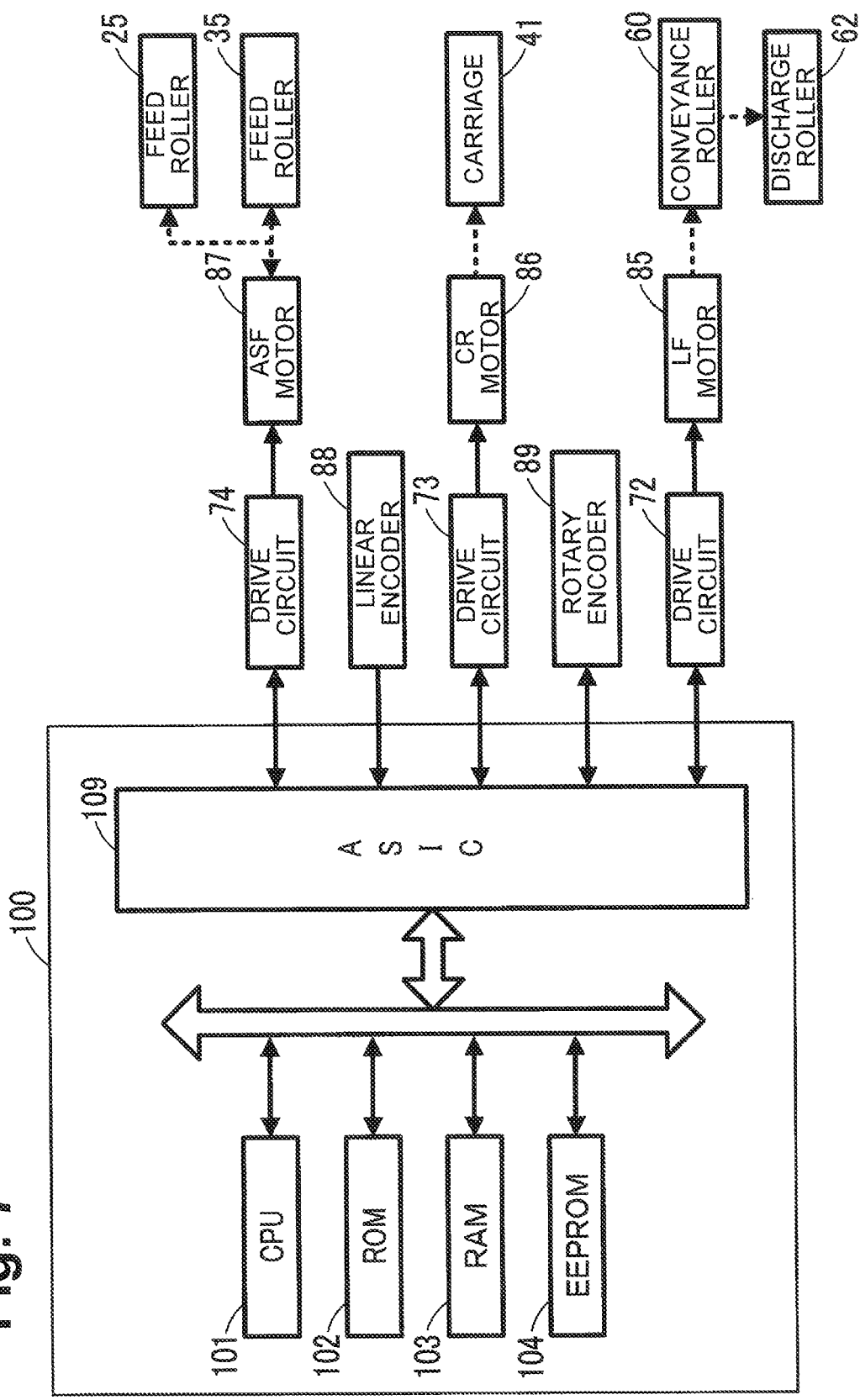
FIG. 7 is a block diagram showing a configuration of a controller.

The controller 100 shown in FIG. 7 not only controls the printer 11, but conducts an overall control of the whole operation of the complex machine 10. The controller 100 is configured as a microcomputer principally including a CPU 101, an ROM 102, an RAM 103, an EEPROM 104, and an application specific integrated circuit (ASIC) 109. The controller 100 functions as the second detection unit, a correction unit, and a control unit. In FIG. 7, a path of transmission of a drive force from each motor 85, 86, and 87 is shown by the broken lines.

A program, or the like, for the CPU 101 to control the motors 85, 86, and 87, and complex machine 10 is stored in the ROM 102. The RAM 103 is used as a storage area in which are temporarily stored various kinds of data used when the CPU 101 executes the program, or as a working area for data processing or the like. A current rotation phase (hereafter referred to as a "current phase $\theta$") of the conveyance roller 60 is stored in the RAM 103. The current phase $\theta$ is appropriately renewed every time the conveyance roller 60 is rotated. The EEPROM 104 stores a setting, a flag, or the like, which is to be held even after powering off. A correction value function $A(\theta)$, to be described hereafter, is stored in the EEPROM 104. The correction value function $A(\theta)$ is a function which regulates a correlation between the rotation phase of the conveyance roller 60 and a correction value of an amount of conveyance of the printing paper 50 per rotation phase of the conveyance roller 60. That is, in the embodiment, the EEPROM 104 functions as a storage unit.

Drive circuits 72, 73, and 74, a linear encoder 88 (an example of a carriage position detector), and a rotary encoder 89 (an example of a rotation amount detector) are connected to the ASIC 109. The scanner 12, operation panel 14, and the like, are connected to the controller 100.

The drive circuit 72 drives the LF motor 85. The shaft 76 of the conveyance roller 60 and the shaft of the discharge roller 62 are connected to the LF motor 85 via the transmission gears 77 and 78, and the like. The drive circuit 72 drives the LF motor 85 by receiving an output signal from the ASIC 109. The drive force of the LF motor 85 is transmitted to the shaft 76 and the like, and the conveyance roller 60 and discharge roller 62 rotate in synchronization. The printing paper 50 fed to the conveyance path 19, after being conveyed along the conveyance path 19 under the rotative force of the conveyance roller 60 or discharge roller 62, is discharged onto the top surface 23 of the paper feed cassette 22.

The drive circuit 73 drives the CR motor 86 by receiving an output signal from the ASIC 109. The drive force of the CR motor 86 is transmitted to the carriage 41 via the belt drive mechanism 46. Therefore, the carriage 41 moves in the width direction 121.

The drive circuit 74 drives the ASF motor 87. The ASF motor 87 is connected to the feed roller 25 or feed roller 35 via an unshown drive transmission mechanism. The drive circuit 74 rotates the ASF motor 87 by receiving an output signal from the ASIC 109. Then, the drive transmission mechanism transmits the drive force of the ASF motor 87 selectively to the feed roller 25 or feed roller 35. A topmost sheet of printing paper 50 in the paper feed cassette 21 or paper feed cassette 22 is fed to the conveyance paths 18 and 19 under the rotative force of the feed roller 25 or feed roller 35.

The linear encoder 88 detects the pattern of the encoder strip 51 by means of the optical sensor 52 mounted on the carriage 41, and outputs a pulse signal. The controller 100, based on the output pulse signal, determines the speed and position of the carriage 41, and controls the drive of the CR motor 86. Also, as will be described hereafter, the controller 100 determines the origin position of the conveyance roller 60 based on the fact that a movement of the carriage 41 has been detected based on the pulse signal from the linear encoder 88.

The rotary encoder 89 detects a mark of the encoder disk 71 by means of the optical sensor 55, and outputs a pulse signal. The controller 100, based on the output pulse signal, determines a rotation amount of the conveyance roller 60, and controls the drive of the LF motor 85.

Figure 8A:
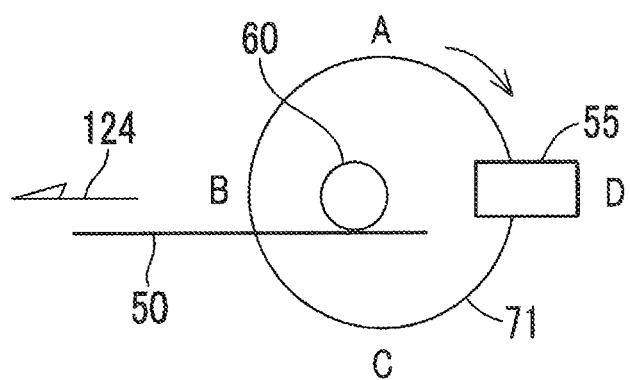
FIG. 8A is a schematic diagram of an encoder disk and optical sensor.

However, in order for the printing paper 50 to be conveyed with high accuracy in the printer 11, it is preferable that linearity is established between the rotation amount of the conveyance roller 60 detected by the rotary encoder 89 and an actual rotation amount of the conveyance roller 60. A condition in which an eccentric encoder disk 71 is attached to the shaft 76 of the conveyance roller 60 is shown in FIG. 8A. Due to this kind of eccentricity of the encoder disk 71, a warpage or uneven coating thickness of the conveyance roller 60, an eccentricity of the transmission gear 77 meshed with the shaft 76 of the conveyance roller 60, or the like, a rotation amount of the conveyance roller 60 per rotation phase detected by the rotary encoder 89 fluctuates cyclically with one revolution of the conveyance roller 60 as one cycle (refer to FIG. 8B). In the example shown in FIGS. 8A and 8B, when a position B of the encoder disk 71 is detected, an amount of conveyance of the printing paper 50 per pulse signal output from the rotary encoder 89 is large. Contrarily, when a position D of the encoder disk 71 is detected, the amount of conveyance of the printing paper 50 per pulse signal output from the rotary encoder 89 is small. In this way, the amount of conveyance of the printing paper 50 by the conveyance roller 60 fluctuates cyclically.

For this reason, the controller 100 (an example of a correction section), in order to control the cyclical fluctuation in the amount of conveyance by the conveyance roller 60, controls the drive of the LF motor 85, and corrects the rotation amount of the conveyance roller 60 in such a way that the rotation amount is uniform. The correction value function $A(\theta)$ used for correction processing of the rotation amount is stored in the EEPROM 104. Hereafter, a description will be given of a process of acquiring the correction value function $A(\theta)$. The correction value function $A(\theta)$ may be acquired and written in advance on the EEPROM 104 before a factory shipment of the complex machine 10. However, the correction value function $A(\theta)$ may also be written on the EEPROM 104 by a user executing a predetermined operation in accordance with a manual or instructions displayed on the operation panel 14 when starting using the complex machine 10.

Acquisition of Correction Value Function $A(\theta)$

In the embodiment, the conveyance roller 60 is configured in such a way that the printing paper 50 is ejected 1.2 inches when the conveyance roller 60 rotates one revolution. Also, it is taken that a nozzle density of the print head 42 in the conveyance direction 124 is 150 dpi, and that 8640 pulse signals are output from the rotary encoder 89 when the encoder disk 71 rotates one revolution.

The controller 100 controls the drive of the ASF motor 87, and feeds the printing paper 50 from the paper feed cassette 21 or paper feed cassette 22 to the conveyance path 19. Then, the controller 100 controls the operation of the recording section 40, causing the recording section 40 to record one line long in the width direction 121 on the leading end side of the printing paper 50 (refer to FIG. 9A). Specifically, the controller 100, while moving the carriage 41 a first distance from one end side to the other end side in the width direction 121, ejects ink from the nozzles farthest upstream (first nozzles) in the conveyance direction 124 of the print head 42. On one long line being drawn on the leading end side of the printing paper 50 in this way, the controller 100 controls the drive of the LF motor 85, and conveys the printing paper 50 by an amount equivalent to 0.57 inches' worth of pulse signals. Specifically, the controller 100 drives the LF motor 85 until 4104 (=8640× 0.57/1.2) pulse signals are output from the rotary encoder 89, and conveys the printing paper 50 to the conveyance roller 60. The LF motor 85 is stopped after the number of pulse signals output from the rotary encoder 89 reaches 4104.

Figure 9A:
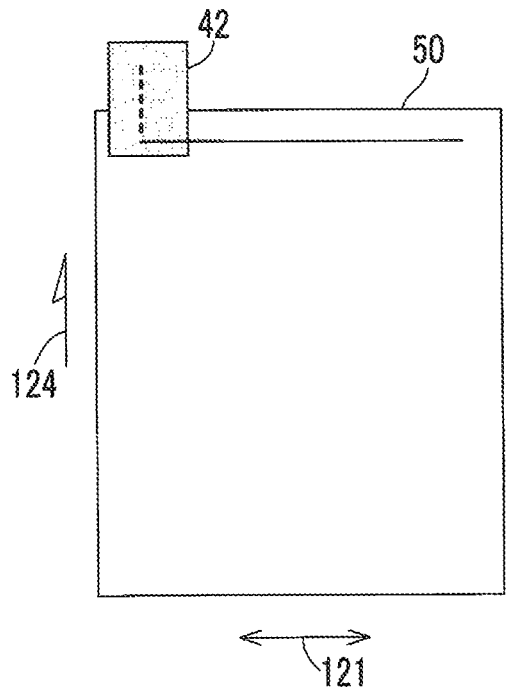
FIGS. 9A to 9D are diagrams for illustrating a process of acquiring a correction value function $A(\theta)$.
Figure 9B:
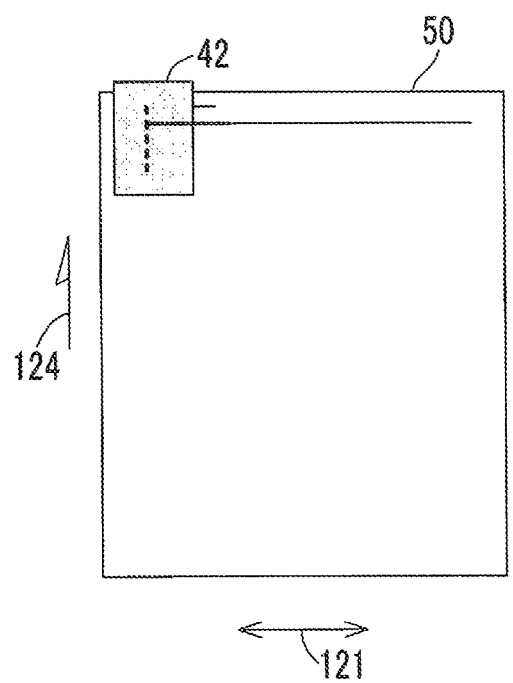
Figure 9C:
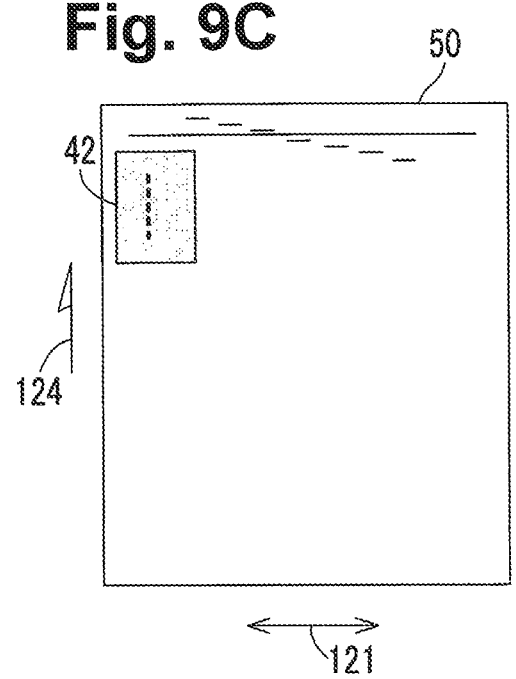

Next, the controller 100 causes the recording section 40 to record one line short in the width direction 121 on the printing paper 50 (refer to FIG. 9B). Specifically, the controller 100, while moving the carriage 41 a second distance, which is shorter than the first distance, from one end side to the other end side in the width direction 121, ejects ink from the 91st nozzles from the nozzles farthest upstream in the conveyance direction 124 of the print head 42. As the density of the print head 42 in the conveyance direction 124 is 150 dpi, a distance in the conveyance direction 124 between the first nozzles and 91st nozzles is 0.6 (=(91−1)/150) inches. For this reason, the 91st nozzles and aforementioned long line are ideally spaced 0.03 (=0.6−0.57) inches apart in the conveyance direction 124.

The controller 100 repeats the operation of causing the recording section 40 to draw the short line and the operation of causing the LF motor 85 to convey the printing paper 50 by an amount equivalent to 0.01 inches' worth of pulse signals (=8640×0.01/1.2) alternately. By this means, seven short lines are recorded on the printing paper 50 (refer to FIG. 9C). The recording operation by the print head 42 is carried out while a position of the carriage 41 in the width direction 121 is being changed in such a way that positions of the seven short lines in the width direction 121 differ.

Figure 9D:
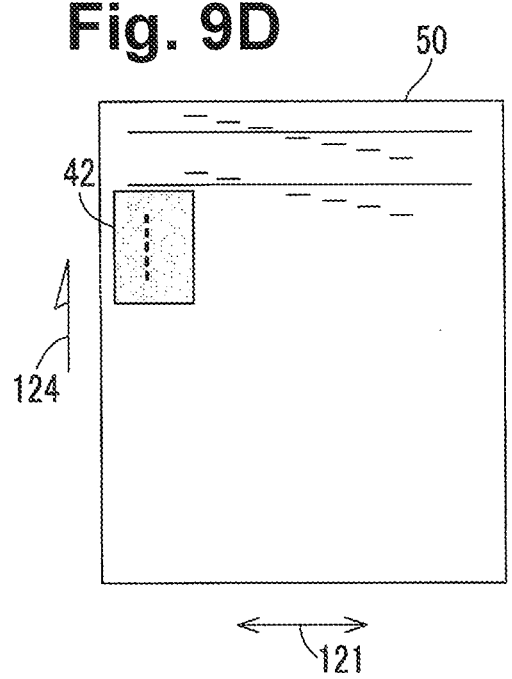

Then, the controller 100 causes another long line to be recorded in a position in which the printing paper 50 is advanced 0.1 inches, and repeats the process of recording the seven short lines with respect to the long line (refer to FIG. 9D). By this kind of process of recording the one long line and seven short lines being repeated as one pattern, a total of 12 patterns are recorded on the printing paper 50 (refer to FIG. 10A).

Continuing, it is determined in each pattern what number short line is most exactly superimposed on the long line, or whether the long line is between adjacent short lines. Specifically, the printing paper 50 is placed on contact glass of the scanner 12, and the scanner 12 is caused to execute an image reading from the printing paper 50. Then, the controller 100 determines what number short line is most exactly superimposed on the long line, or whether the long line is between adjacent short lines. This determination process is carried out in each pattern. In the event of the printing paper 50 shown in FIG. 10A, numerical values can be determined to be 3, 2.5, 2, 3, 4, 4, 5, 6, 6.5, 6, 4, and 3.5 in order from the topside long line in the FIG. 10A. In the event that the long line is between two adjacent short lines, the determination is made by adding 0.5 to the number of the line of the two adjacent short lines with the smallest number.

The first nozzle and 91st nozzle are spaced 0.6 inches apart in the conveyance direction 124. For this reason, in the event that the numerical value is 4, it indicates that the printing paper 50 has actually been conveyed 0.6 (=0.57+0.01×(4−1)) inches with respect to a target conveyance amount of 0.6 inches. In the event that the numerical value is 3, it indicates that the printing paper 50 has actually been conveyed 0.6 inches with respect to a target conveyance amount of 0.59 (=0.57+0.01×(3−1)) inches. This represents that the printing paper 50 has been conveyed by a peripheral surface of the conveyance roller 60 on a position B side in FIG. 8A. In the event that the numerical value is 5, it indicates that the printing paper 50 has actually been conveyed 0.6 inches with respect to a target conveyance amount of 0.61 (=0.57+0.01×(5−1)) inches. This represents that the printing paper 50 has been conveyed by a peripheral surface of the conveyance roller 60 on a position D side in FIG. 8A.

Figure 8B:
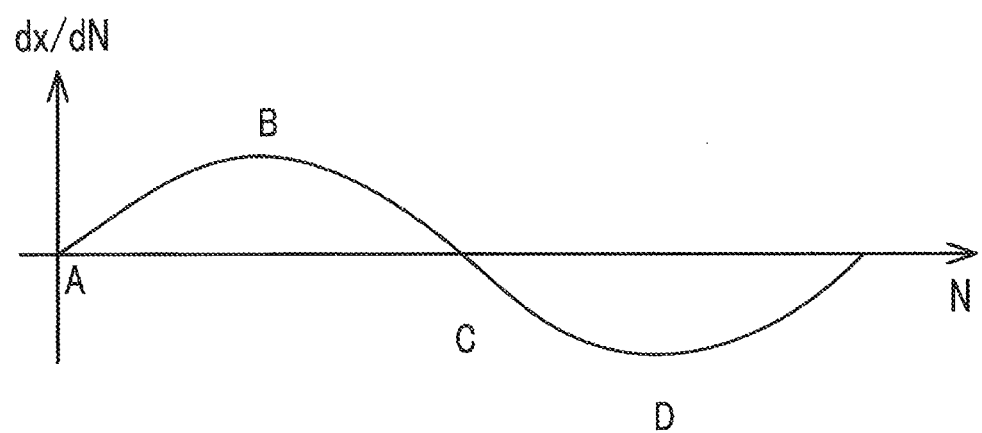
FIG. 8B is a diagram illustrating an amount of conveyance of printing paper per pulse signal output from a rotary encoder.

A graph equivalent to that of FIG. 8B can be obtained (refer to FIG. 10B) by allotting pulse numbers to the horizontal axis in increments of 1/12 revolution (720 pulses), and representing a conveyance amount per pulse number as a ratio thereof to a target conveyance amount in the vertical axis. That is, it is possible to ascertain how the amount of conveyance of the printing paper 50 differs from the target conveyance amount while the conveyance roller 60 is rotating one revolution.

Figure 10A:
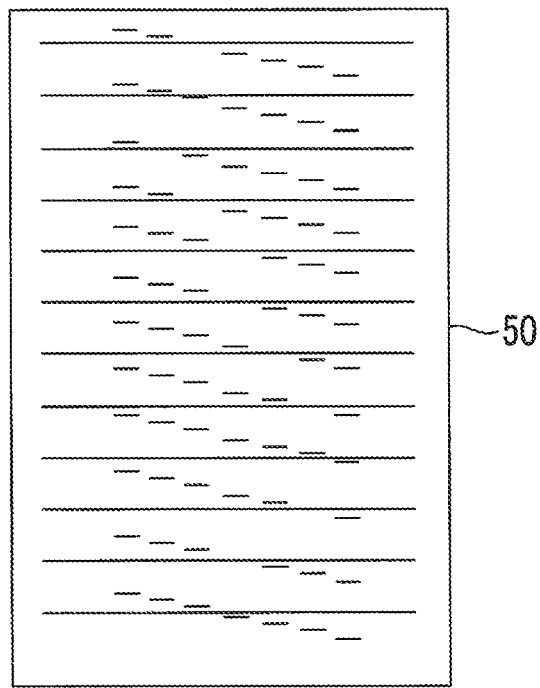
FIGS. 10A and 10B are diagrams for illustrating the process of acquiring the correction value function $A(\theta)$.
Figure 10B:
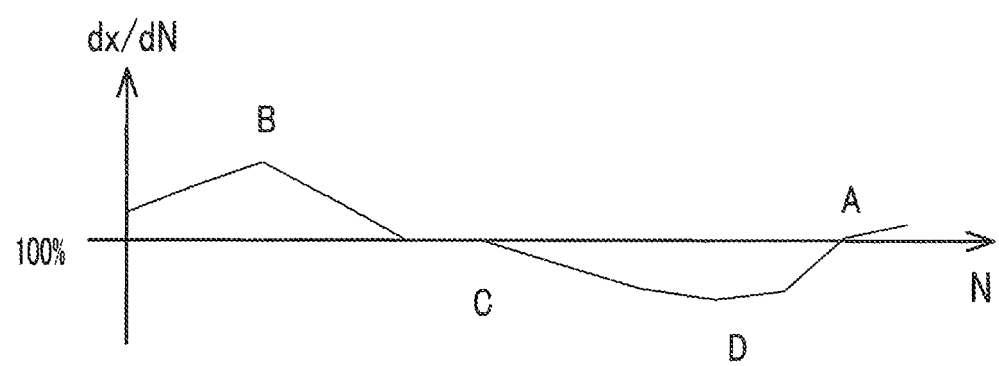

How much the current encoder disk 71 rotates with respect to a rotation phase of the encoder disk 71 when a first long line is recorded when the patterns shown in FIG. 10A are recorded on the printing paper 50 can be ascertained as long as a rotation of the conveyance roller 60 is detected by the rotary encoder 89. Consequently, the cyclical fluctuation in the amount of conveyance of the printing paper 50 can be suppressed by, when a command to convey the printing paper 50 is input, calculating from the previously described graph an average difference in the amount of conveyance by the conveyance roller 60 from a current position to a position after a completion of the conveyance, and correcting a target conveyance amount by taking into account an effect of the average difference in advance.

The rotation phase of the encoder disk when the first long line is recorded matches the origin position of the conveyance roller, to be described hereafter, or is regulated in a position with a predetermined phase difference from the origin position. In the embodiment, the correction value function $A(\theta)$ for correcting the target amount of conveyance of the printing paper 50 is generated based on the graph shown in FIG. 10B, and stored in the EEPROM 104. For this reason, even in the event that the complex machine 10 is powered on again after being powered off, it is possible, by detecting a physical origin of the rotation phase of the conveyance roller 60, to appropriately correct the rotation amount of the conveyance roller 60.

Acquisition of Origin Position

Hereafter, a description will be given, while referring to the flowchart of FIG. 11, of a procedure of processes carried out in the printer 11 when the complex machine 10 is powered on. The following processes to be described based on the flowchart are carried out in accordance with commands which the controller 100 (an example of an origin determination section) issues based on the program stored in the ROM 102.

The controller 100, based on an existence or otherwise of an operation of a predetermined input key of the operation panel 14, determines whether or not the complex machine 10 has been powered on (S1). If the controller 100 determines that the complex machine 10 has not been powered on (S1: No), a waiting condition starts. If the controller 100 determines that the complex machine 10 has been powered on (S1: Yes), it controls the drive circuit 73, and drives the CR motor 86 (S2). On the complex machine 10 being powered off, the controller 100 moves the carriage 41 to a home position. The home position is an end on a side opposite to the transmission gear 77 (the right side in FIG. 3) in a reciprocation range of the carriage 41. An end of the carriage 41 reciprocation range on a side on which the transmission gear 77 is disposed is called an end position (the left side in FIG. 3). The end position is an example of a detection position.

On the CR motor 86 being driven, the carriage 41 positioned in the home position moves toward the end position. The controller 100, based on a result of detection by the linear encoder 88, determines whether or not the carriage 41 has reached the end position (S3). The CR motor 86 is driven until the carriage 41 reaches the end position. Then, on the carriage 41 reaching the end position (S3: Yes), the controller 100 stops the CR motor 86 (S4).

On the carriage 41 being positioned in the end position, the controller 100 executes the flushing (S5). The flushing need not necessarily be carried out but, in the event that a time for which the carriage 41 is stopped in the end position is long in a subsequent operation, it is preferable that the flushing is always carried out in order to prevent or reduce a drying or nozzle clogging of the print head 42 during the stopping time. This flushing operation is appropriately carried out during the subsequent processes too.

The controller 100 drives the LF motor 85 on a condition that the CR motor 86 is not driven (S6). On the LF motor 85 being driven, the transmission gear 77 rotates, and the conveyance roller 60 and discharge roller 62 also rotate. As the carriage 41 is positioned in the end position, on the transmission gear 77 attaining the predetermined rotation phase, the reference portion 80 makes abutment with the abutment portion 53 of the carriage 41. Specifically, one of the inclined surfaces 81 and 82 of the reference portion 80 makes abutment with the carriage 41 and, by the transmission gear 77 being further rotated, the abutment portion 53 of the carriage 41 moves from one of the inclined surfaces 81 and 82 of the transmission gear 77 toward the surface 83. Therefore, the carriage 41 positioned in the end position is moved in such a way as to be pushed to the home position side by the reference portion 80. This kind of abutment of the reference portion 80 with the abutment portion 53 of the carriage 41 may occurs once every time the transmission gear 77 is rotated one revolution.

The controller 100 monitors a change of the linear encoder 88 while the LF motor 85 is being driven (S7). As previously described, on the carriage 41 positioned in the end position moving to the home position side, a pulse signal is output from the linear encoder 88. The controller 100 detects, as the origin position of the conveyance roller 60, a rotation phase $\theta_0$ of the rotary encoder 89 when the pulse signal is output from the linear encoder 88 (S8). Information indicating the origin position of the conveyance roller 60 is stored in the RAM 103. In the event that no pulse signal is output from the linear encoder 88 (S7: No), and the conveyance roller has not rotated one revolution (S11: No), the controller 100 continues to monitor an output from the linear encoder 88.

Continuing, the controller 100, based on a result of detection by the rotary encoder 89, and on the information indicating the origin position stored in the RAM 103, determines whether or not the current rotation phase of the conveyance roller 60 has reached the origin position (S9). If the controller 100 determines that the rotation phase of the conveyance roller 60 has not reached the origin position (S9: No), the controller 100 drives the LF motor 85 until the rotation phase of the conveyance roller 60 reaches the origin position. If the controller 100 determines that the rotation phase of the conveyance roller 60 has reached the origin position (S9: Yes), it stops the LF motor 85 (S10).

However, as previously described, it may happen that the abutment portion 53 of the carriage 41 makes abutment with the surface 83 of the reference portion 80 of the transmission gear 77 when the carriage 41 is positioned in the end position (S3). In this kind of case, even in the event that the LF motor 85 is subsequently driven and the transmission gear 77 is rotated one revolution or more, the carriage 41 is not moved to the home position side. That is, the linear encoder 88 outputs no pulse signal (S7: No).

In the event that the conveyance roller 60 is rotated one revolution without the linear encoder 88 outputting any pulse signal (S11: Yes), specifically, in the event that the controller 100 determines that the number of pulse signals output from the rotary encoder 89 has reached 8640, the controller 100, after rotating the conveyance roller 60 another 1/N (N is a positive integer other than 1) of one revolution (S12), stops the LF motor 85 (S13). Therefore, the carriage 41 is stopped in a rotation position in which the reference portion 80 makes no contact with the abutment portion 53 of the carriage 41. It is sufficient that a rotation amount of 1/N of one revolution by which the conveyance roller 60 is rotated is optionally set, provided that it is other than an integral multiple of one cycle.

Continuing, the controller 100 returns the carriage 41 to the home position temporarily (S14), and positions the carriage 41 in the end position again (S3). Therefore, the carriage 41 is positioned in the end position on a condition that the abutment portion 53 of the carriage 41 is not in abutment with the surface 83 of the reference portion 80 of the transmission gear 77. Consequently, the origin position of the conveyance roller 60 is reliably detected by the same operation as previously described being carried out.

Printing Paper 50 Conveyance Operation

Figure 12:
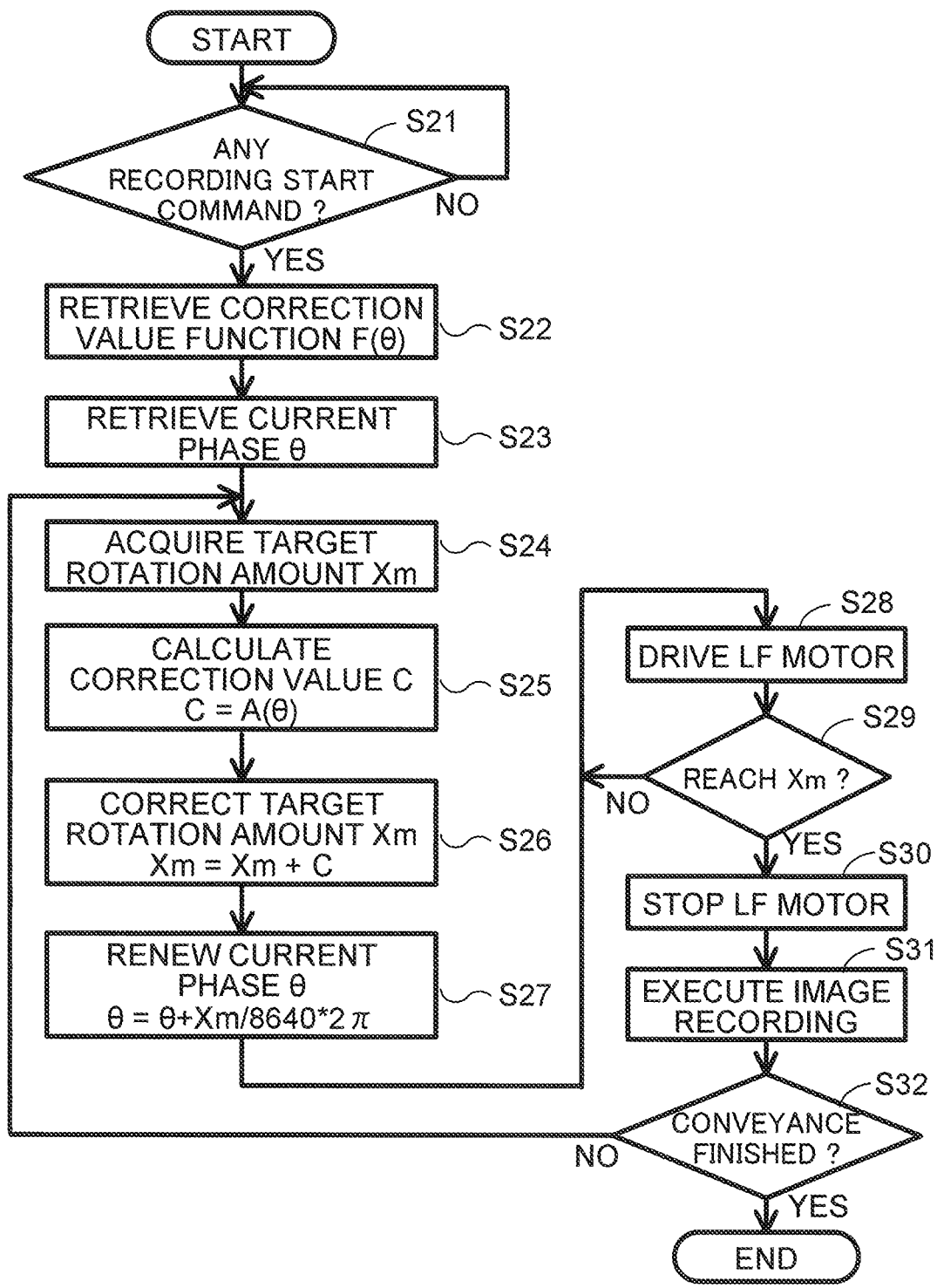
FIG. 12 is a flowchart illustrating a procedure of processes carried out in the complex machine when there is a recording start command.

Hereafter, a description will be given, while referring to the flowchart of FIG. 12, of a procedure of processes carried out in the printer 11 when a recording start command is input into the complex machine 10.

The controller 100 determines whether or not there is a recording start command (S21). Specifically, the controller 100 determines whether or not a command to instruct a recording start, and print data, have been received from the external information equipment, or whether or not an operation input instructing a recording start has been carried out on the operation panel 14. If the controller 100 determines that there is no recording start command (S21: No), a waiting condition starts.

If the controller 100 determines that there is a recording start command (S21: Yes), the controller 100 retrieves the correction value function A(θ) from the EEPROM 104 (S22). The controller 100 further retrieves the current phase θ of the conveyance roller 60 from the RAM 103 (S23). The current phase θ indicates a rotation direction angle from the origin position of the conveyance roller 60. Next, the controller 100 acquires a target rotation amount Xm which is the number of pulse signals to be outputted from the rotary encoder 89 while conveying the printing paper 50 to a target position (S24). Then, the controller 100 substitutes the current phase θ for the correction value function A(θ) retrieved in step S22, and calculates a correction value C representing the number of pulse signals (S25).

The controller 100 adds the correction value C to the target rotation amount Xm acquired in the process of step S24, and corrects the target rotation amount Xm (S26). Then, the controller 100, based on the corrected target rotation amount Xm, renews the current phase θ (S27). As the current phase θ is the rotation direction angle of the conveyance roller 60, in the event that the value thereof exceeds 2π, 2π is subtracted from the value. By this means, the value of the current phase θ is adjusted in such a way that the current phase θ always satisfies the relationship 0≤θ≤2π.

Next, the controller 100 drives the LF motor 85 (S28). Then, the controller 100 determines whether or not the rotation amount of the conveyance roller 60 detected by the rotary encoder 89 has reached the target rotation amount Xm corrected by the process of step S26 (S29). Specifically, the controller 100 determines whether or not the number of pulse signals output from the rotary encoder 89 has reached the target rotation amount Xm. If the controller 100 determines that the rotation amount of the conveyance roller 60 has not reached or will not reach the target rotation amount Xm (S29: No), the process is returned to step S28. That is, the LF motor 85 is driven until the rotation amount of the conveyance roller 60 reaches the target rotation amount Xm.

While the conveyance roller 60 is moving, a cyclical difference with one revolution as one cycle occurs between the rotation amount of the conveyance roller 60 detected by the rotary encoder 89 and the actual rotation amount of the conveyance roller 60. In the embodiment, the current phase of the conveyance roller 60 is determined based on the origin position of the conveyance roller 60 acquired after the complex machine 10 is powered on, and the target rotation amount Xm is corrected based on the correction value C corresponding to the current phase. As the drive of the LF motor 85 is controlled in such a way that the rotation amount of the conveyance roller 60 complies with the target rotation amount Xm after the correction, the cyclical difference in the rotation amount of the conveyance roller 60 is balanced out, and the printing paper 50 is accurately conveyed to a targeted position.

If the controller 100 determines that the rotation amount of the conveyance roller 60 has reached or will reach the target rotation amount Xm (S29: Yes), the controller 100 stops the LF motor 85 (S30). Then, the controller 100 causes the recording section 40 to execute an image recording (S31). Specifically, the controller 100 ejects ink from the print head 42 while moving the carriage 41 from one end side to the other end side in the width direction 121.

The controller 100 determines whether or not the printing paper 50 conveyance operation is completed (S32). If the controller 100 determines that the printing paper 50 conveyance operation is not completed (S32: No), the process is returned to step S24. That is, the processes of step S24 to step S29 are repeated. By this means, as the process of rotating the conveyance roller 60 by the target rotation amount Xm, and the process of recording an image on the printing paper 50, are repeated alternately, continuous images are recorded on the printing paper 50. If the controller 100 determines that the printing paper 50 conveyance operation is completed (S32: Yes), the series of processes is completed.

Working Effects of Embodiment

As heretofore described, the reference portion 80 of the transmission gear 77 rotated in synchronization with the conveyance roller 60 is brought into abutment with the carriage 41 moved to the end position, the carriage 41 is moved to the home position side, and the origin position of the conveyance roller 60 is detected by the linear encoder 88 detecting the movement of the carriage 41. Therefore, it is possible, by making effective use of the transmission gear 77 and linear encoder 88 included in the printer 11 for other purposes, to detect the origin position of the conveyance roller 60 without an accompanying increase in size or cost of the apparatus.

Also, in the embodiment, the correction value C corresponding to the current rotation phase of the conveyance roller 60 is acquired based on the origin position of the rotation phase of the conveyance roller 60 detected by the controller 100, and on the correction value function $A(\theta)$ stored in the EEPROM 104. The target rotation amount Xm is corrected using the correction value C. The cyclical fluctuation in the amount of conveyance of the printing paper 50 is suppressed by the conveyance roller 60 being rotated by the target rotation amount Xm after the correction. As a result, as the printing paper 50 is intermittently conveyed at approximately regular linefeed widths, it is possible to record a neat image with no disturbance on the printing paper 50.

Also, in the embodiment, as the flushing of the print head 42 is carried out in the end position while the origin position of the conveyance roller 60 is being detected, a clogging with ink due to the vicinity of the nozzles of the print head 42 drying while the position origin is being detected is prevented from occurring.

Also, in the embodiment, when the carriage 41 is moved to the end position, the carriage 41 is in abutment with the reference portion 80 of the transmission gear 77 and, when the linear encoder 88 detects no movement of the carriage 41 even though the conveyance roller 60 is rotated one revolution, the conveyance roller 60 is rotated by a rotation amount other than an integral multitude of one cycle, and the carriage 41, after being moved to the home position, is moved to the end position again, meaning that the carriage 41 is put into a condition in which it is not in abutment with the reference portion 80 of the transmission gear 77 (an example of the rotating body). Therefore, the position origin of the conveyance roller 60 is reliably detected.

In the embodiment, the reference potion 80 provided on the transmission gear 77 has been taken to be one protruded from the surface 83 of the transmission gear 77 in the width direction 121, but the reference portion 80 may also be, for example, one depressed in the surface 83 of the transmission gear 77 in the width direction 121. Then, on the carriage 41 being rotated in a condition in which it is pressed into contact with the surface 83 of the transmission gear 77, and being moved by the reference portion 80 in the direction in which the reference portion 80 is depressed, the movement of the carriage can be detected by the linear encoder 88.

Also, in the embodiment, a description has been given of an embodiment in which the rotation amount of the conveyance roller 60 is detected by the rotary encoder 89, but the rotation amount of the conveyance roller 60 may also be detected using, for example, a magnetic sensor instead of the rotary encoder 89.

Also, in the embodiment, a description has been given of an embodiment in which the LF motor 85 is a DC motor, but the LF motor 85 may also be a stepping motor. In this case, there is no need for the rotary encoder 89.

What is claimed is:

1. An image recording apparatus comprising:
a conveyance roller which conveys a recording medium along a conveyance path in a conveyance direction;
a print head which executes an image recording on the recording medium conveyed by the conveyance roller;
a carriage which, being mounted with the print head, is configured to move in a movement direction intersecting the conveyance direction;
a sensor which is mounted with the carriage; and,
an origin determiner configured to determine an origin position of a rotation phase of the conveyance roller based on a signal outputted, during the conveyance roller is rotated, from the sensor mounted with the carriage.

2. The image recording apparatus according to claim 1, further comprising:
an object to be detected by the sensor mounted with the carriage; and
a moving mechanism configured to relatively move the sensor and the object at a timing corresponding to the rotation phase of the conveyance roller.

3. The image recording apparatus according to claim 2, wherein the moving mechanism is configured to move the carriage with the sensor at the timing corresponding to the rotation phase of the conveyance roller.

4. The image recording apparatus according to claim 3, wherein the moving mechanism comprises a rotating body which includes an abutment portion configured to abut the carriage at the timing corresponding to the rotation phase of the conveyance roller.

5. The image recording apparatus according to claim 4, wherein the rotating body is configured to rotate around a rotation axis of the conveyance roller.

6. The image recording apparatus according to claim 1, further comprising a linear encoder strip elongated in the movement direction of the carriage,
wherein the sensor is configured to sense the linear encoder strip to output the signal.

7. The image recording apparatus according to claim 1, wherein the sensor is disposed on a downstream of the print head with respect to the conveyance path.

8. The image recording apparatus according to claim 1, wherein the sensor is configured to detect a light which changes corresponding to the rotation phase of the conveyance roller.

9. An image recording apparatus comprising:
a conveyance roller which conveys a recording medium along a conveyance path in a conveyance direction;
an encoder disk which is configured to rotate as the conveyance roller rotates;
a print head which executes an image recording on the recording medium conveyed by the conveyance roller;
a carriage which, being mounted with the print head, is configured to move in a movement direction intersecting the conveyance direction;
a first sensor which is mounted with the carriage and is configured to output a first signal;
a second sensor configured to sense the encoder disk and to output a second signal; and,
an origin determiner configured to determine an origin position of a rotation phase of the conveyance roller based on the first signal outputted, during the conveyance roller is rotated, from the sensor mounted with the carriage and on the second signal outputted from the second sensor.

10. The image recording apparatus according to claim 9, further comprising:
an object to be detected by the first sensor mounted with the carriage; and
a moving mechanism configured to relatively move the first sensor and the object at a timing corresponding to the rotation phase of the conveyance roller.

11. The image recording apparatus according to claim 10, wherein the moving mechanism is configured to move the carriage with the first sensor at the timing corresponding to the rotation phase of the conveyance roller.

12. The image recording apparatus according to claim 11, wherein the moving mechanism comprises a rotating body which includes an abutment portion configured to abut the carriage at the timing corresponding to the rotation phase of the conveyance roller.

13. The image recording apparatus according to claim 12, wherein the rotating body is configured to rotate around a rotation axis of the conveyance roller.

14. The image recording apparatus according to claim 9, further comprising a linear encoder strip elongated in the movement direction of the carriage,
   wherein the first sensor is configured to sense the linear encoder strip to output the first signal.

15. The image recording apparatus according to claim 9, wherein the first sensor is disposed on a downstream of the print head with respect to the conveyance path.

16. The image recording apparatus according to claim 9, wherein the first sensor is configured to detect a light which changes corresponding to the rotation phase of the conveyance roller.

* * * * *